(12) United States Patent
Liu et al.

(10) Patent No.: US 7,368,170 B2
(45) Date of Patent: May 6, 2008

(54) VISCOUS CHEMICAL ANCHORING ADHESIVE

(75) Inventors: Wen-Feng Liu, Naperville, IL (US); Eldridge Presnell, Round Lake Beach, IL (US); James E. Surjan, St. Charles, IL (US)

(73) Assignee: Illinois Tool Works Inc., Glenview, IL (US)

( * ) Notice: Subject to any disclaimer, the term of this patent is extended or adjusted under 35 U.S.C. 154(b) by 444 days.

(21) Appl. No.: 10/883,589

(22) Filed: Jul. 1, 2004

(65) Prior Publication Data
US 2006/0004127 A1    Jan. 5, 2006

(51) Int. Cl.
B32B 27/38    (2006.01)
B32B 27/20    (2006.01)
B32B 7/12    (2006.01)
C09J 163/00    (2006.01)
C08L 63/00    (2006.01)

(52) U.S. Cl. .................. 428/413; 428/343; 428/355 R; 428/355 EP; 523/440; 523/443; 523/466; 156/327; 156/330

(58) Field of Classification Search ................ 428/413, 428/343, 355 R, 355 EP; 523/400, 440, 523/443, 466; 156/325, 326, 327, 330
See application file for complete search history.

(56) References Cited

U.S. PATENT DOCUMENTS

| | | |
|---|---|---|
| 3,385,427 A | 5/1968 | Stouls |
| 3,494,990 A | 2/1970 | Balint |
| 3,708,379 A | 1/1973 | Flint |
| 3,781,965 A | 1/1974 | Bone |
| 3,837,981 A | 9/1974 | Flint |
| 3,900,999 A | 8/1975 | Callan |
| 3,971,117 A | 7/1976 | Osterhout et al. |
| 4,040,471 A | 8/1977 | McCray et al. |
| 4,103,771 A | 8/1978 | Klatt et al. |
| 4,105,114 A | 8/1978 | Knox et al. |
| 4,250,074 A | 2/1981 | Foscante et al. |
| 4,286,899 A | 9/1981 | Benichou et al. |
| 4,340,637 A | 7/1982 | Koob et al. |
| 4,516,884 A | 5/1985 | Douty |
| 4,560,902 A | 12/1985 | Kardon |
| 4,678,374 A | 7/1987 | Calandra, Jr. |
| 4,759,888 A | 7/1988 | Brest van Kempen |
| 5,027,981 A | 7/1991 | Magister |
| 5,129,977 A | 7/1992 | Leatherman |
| 5,229,438 A | 7/1993 | Ishida et al. |
| 5,352,308 A | 10/1994 | Tomihara et al. |
| 5,447,593 A | 9/1995 | Tanaka et al. |
| 5,480,067 A | 1/1996 | Sedlmeier |
| 5,486,096 A | 1/1996 | Hertel et al. |
| 5,544,981 A | 8/1996 | Nishida et al. |
| 5,554,240 A | 9/1996 | Toy |
| 5,563,217 A | 10/1996 | Davis et al. |
| 5,697,524 A | 12/1997 | Sedlmeier |
| 5,714,216 A | 2/1998 | Banhardt et al. |
| 5,730,557 A | 3/1998 | Skupien et al. |
| 5,731,366 A | 3/1998 | Moench et al. |
| 5,738,939 A | 4/1998 | Calhoun et al. |
| 5,859,114 A | 1/1999 | Davis et al. |
| 5,953,879 A | 9/1999 | Fischer et al. |
| 6,033,153 A | 3/2000 | Fergusson |
| 6,214,159 B1 | 4/2001 | Armin |
| 6,291,555 B1 | 9/2001 | Surjan et al. |
| 6,402,434 B1 | 6/2002 | Surjan et al. |
| 6,403,678 B1 | 6/2002 | Surjan et al. |
| 6,416,256 B1 | 7/2002 | Surjan et al. |
| 6,420,458 B1 | 7/2002 | Surjan et al. |

FOREIGN PATENT DOCUMENTS

| | | |
|---|---|---|
| AU | 48487/97 | 6/1998 |
| DE | 197 36 850 | 2/1999 |
| DE | 197 39 764 | 3/1999 |
| EP | 849 345 | 6/1998 |
| GB | 2241759 | 9/1991 |
| GB | 2 289 737 A | 11/1995 |
| WO | 98/55772 | 12/1998 |

OTHER PUBLICATIONS

*La nouvelle recharge pour chevilles chimiques HVU Hilti: une championne qui sait "encaisser"!*, company brochure (9 pages), Hilti (Suisse) SA, (1996).
*Technical Guide Supplement HILTI HVA Adhesive Anchoring System* (11 pages), Hilti, Inc., 1997.
*Shell Resins*, EPON® RESIN 828 specification sheet, Shell Oil Co., undated.
*Epoxy Curing Agents and Diluents*, ANCAMINE® 1856 Curing Agent specification sheet, Air Products and Chemicals, Inc., undated.
*Epoxy Curing Agents and Modifiers*, ANCAMINE® K54 Curing Agent specification sheet, Air Products and Chemicals, Inc., Feb. 1998.
*Epoxy Curing Agents*, ANCAMINE® 1767 Curing Agent specification sheet, Air Products and Chemicals, Inc., Nov. 1997.
*Epoxy Curing Agents*, specification sheets (5 pages), Air Products and Chemicals, Inc., undated.
*Acceptance Criteria For Adhesive Anchors In Concrete And Masonry Elements*, International Conference of Building Officials, Jan. 1-11, 1999.
*Iron and Steel*, Textbook, Section 6, pp. 17-30, undated.
*Condensed Chemical Dictionary*, Van Nostrand Reinhold Co. p. 844, 1971.

*Primary Examiner*—Michael J Feely
(74) *Attorney, Agent, or Firm*—Pauley Petersen & Erickson

(57) ABSTRACT

A chemical anchoring adhesive includes a first part having a viscosity of about 200,000 to about 4,000,000 centipoise and a second part having a viscosity of about 200,000 to about 4,000,000 centipoise. The chemical anchoring adhesive can be in the form of a slug or rope. The first and second parts are directly joined along an interface, which may extend the length of the slug or rope. The first part includes a resin and a particulate filler of a type and amount required to achieve the desired viscosity. The second part includes a curing agent and a particulate filler of a type and amount required to achieve the desired viscosity.

16 Claims, 3 Drawing Sheets

VISCOUS CHEMICAL ANCHORING ADHESIVE

FIELD OF THE INVENTION

This invention is directed to a viscous chemical anchoring adhesive useful in industrial and commercial applications such as bridges, airports, highways, skyscrapers, stadiums and tunnels.

BACKGROUND OF THE INVENTION

High viscosity chemical anchoring adhesives are disclosed in U.S. Pat. Nos. 6,291,555; 6,402,434; 6,403,678, 6,416,256 and 6,420,458. The adhesives may be in the form of a rope or cylindrical slugs, and include a first part A and a second part B joined along an interface. The adhesive slugs are each inserted into a borehole. A driving tool having rotational and, possibly, axial motion is used to drive an anchor pin into the borehole. The rotational motion of the anchor pin, effected by the driving tool, causes mixing of the first and second adhesive parts, resulting in a chemical reaction which cures the adhesive and firmly binds the anchor pin to the inner surface of the borehole.

The first and second parts of the above-described adhesives have viscosities of about 5 million to about 50 million centipoise, and are essentially solid yet pliable at room temperature. The above-described adhesives differ from other known two-part chemical anchoring adhesives in which one or both parts are liquid, and require separate encapsulation prior to use. While the above-described highly viscous adhesives perform well, there is always a need or desire for a chemical anchoring adhesive having improved adhesive performance which maintains the advantages of the highly viscous two-part adhesives.

SUMMARY OF THE INVENTION

The present invention is directed to a viscous chemical anchoring adhesive including a fist part A and a second part B joined along an interface, in which each of the first and second parts has a viscosity of about 200,000 to about 4 million centipoises, measured at 25° C., using a Brookfield Viscometer, Model DV-3, made by Brookfield Engineering Co. The chemical anchoring adhesive maintains pins, hangars, bolts, rods and other anchor devices firmly in place, in structural openings formed in concrete, masonry, metals (e.g., steel), ceramics, plastics, glass and wood. The high viscosity assures that the adhesive may be formed, shaped and/or cut with a knife, but will not flow out of a borehole prior to insertion of the anchor pin.

The first part of the adhesive includes at least a resin. In one embodiment, the first part includes an epoxy resin (e.g., a liquid epoxy resin) and a particulate filler, in proportions required to achieve the desired viscosity.

The second part of the adhesive includes at least a curing agent. In one embodiment, the second part includes at least a curing agent and a particulate filler, in proportions required to achieve the desired viscosity. The curing agent may include a curing compound and a curing accelerator.

The first and second parts can be extruded, pressed, or otherwise joined together in the form of a rope having a cylindrical, rectangular, square, triangular, or other suitable shape. The rope may have any suitable cross-sectional diameter, and any suitable length. The rope may be wrapped around its circumference with a suitable wrapper of plastic film, metal foil, paper, or the like. The first and second parts are directly joined along at least one interface extending the length of the rope. By "directly joined" it is meant that no film, capsule or other barrier is interposed between the two parts.

The rope of anchoring adhesive may be cut or sheared to any size, depending on the depth of the borehole. In one embodiment, the proper amount of adhesive can be measured by the depth of the borehole, i.e., by inserting a rope end into the borehole as far as possible, and cutting the rope at the top of the borehole. If the boreholes vary in depth, the adhesive may be cut or sheared to varying lengths on the job site, to provide the optimum amount of adhesive for each borehole. Because the two parts are extruded side-by-side, the amount of each part relative to the other is substantially consistent along the length of the rope. The only direct contact between the two parts prior to use is along a single interface. Premature reaction between them is thereby minimized without requiring encapsulation of one part relative to the other.

DETAILED DESCRIPTION OF THE PRESENTLY PREFERRED EMBODIMENTS

The present invention is directed to a viscous chemical anchoring adhesive having excellent adhesion between anchor pins and boreholes formed in concrete, steel, masonry, ceramic, glass, wood, plastic or another construction material.

Figure 1:
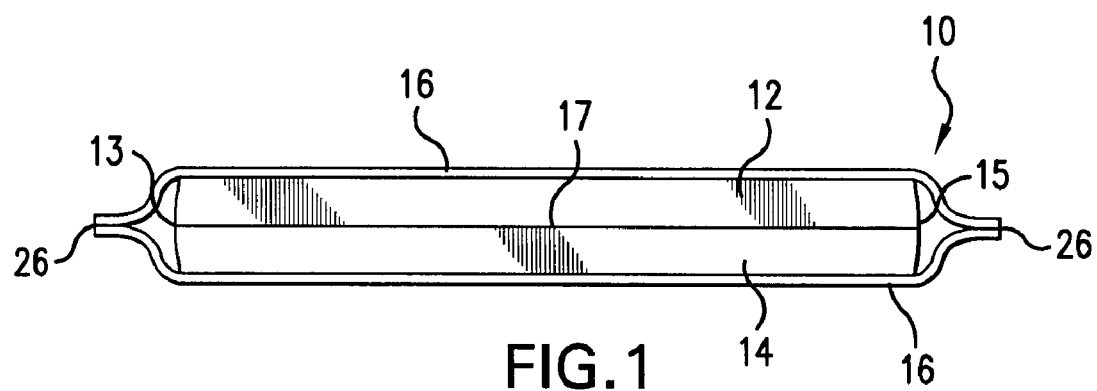
FIG. 1 illustrates an adhesive slug according to the invention wrapped with a tubular film.

Referring to FIG. 1, a viscous, essentially solid phase anchoring adhesive is shown in the form of a slug 10 which is adapted for insertion into a borehole. The slug 10 is shown as a cylinder, but may have any suitable shape and size, depending on the shape and size of the borehole. The adhesive slug 10 includes a first part 12 and a second part 14 continuously and directly joined in face-to-face contact along interface 17, which extends the length of the slug 10. The adhesive slug 10 should contain about 10-90% by weight of each of the first and second parts 12 and 14, based on the combined weight of the first part 12 and second part 14. Suitably, the slug 10 contains about 25-80% by weight of the first part 12 and about 20-75% by weight of the second part 14, more preferably about 50-75% by weight of the first part 12 and about 25-50% by weight of the second part 14, most preferably about 59% by weight of the first part 12 and about 41% by weight of the second part 14. The slug 10 is surrounded on its side by a wrapper 16 which may, but need not, cover the two ends 13 and 15 of slug 10, and may be heat sealed at wrapper ends 26.

Figure 2:
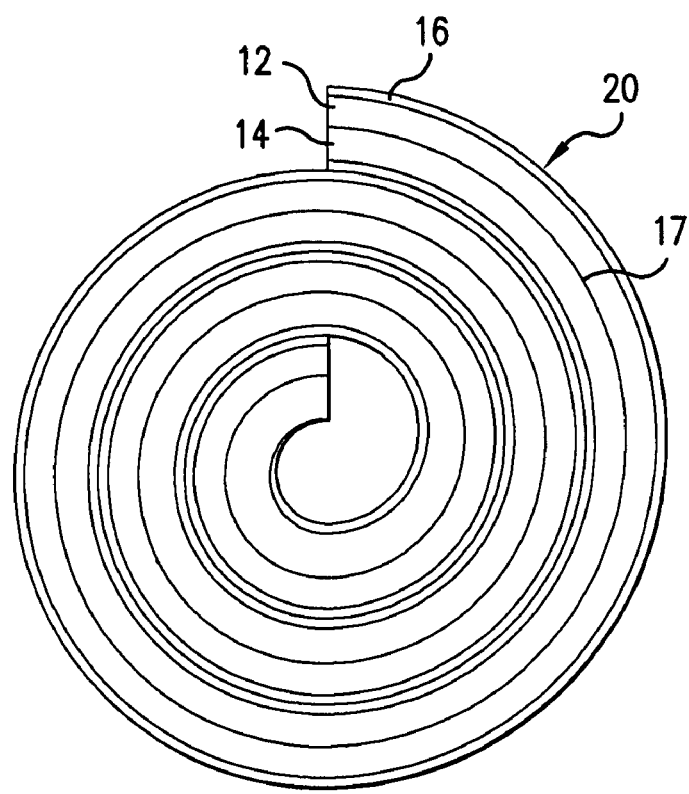
FIG. 2 illustrates an adhesive rope according to the invention wrapped with a tubular film.

Referring to FIG. 2, the viscous chemical anchoring adhesive may be extruded and stored as a rope 20, which is later cut into individual slugs 10 at the job site.

The first part 12 of adhesive slug 10 has a viscosity of about 200,000 to about 4,000,000 centipoise at 25° C., suitably about 500,000 to about 1,000,000 centipoise. The viscosity is measured using a Brookfield Viscometer, Model DV-3, made by Brookfield Engineering Co., using the procedure set forth in the manufacturer's instructions. The second part 14 of the adhesive slug 10 has a viscosity of about 200,000 to about 4,000,000 centipoise at 25° C., suitably about 500,000 to about 1,000,000 centipoise. These viscosities ensure that the first and second parts 12 and 14 have a relatively solid, pliable consistency, allowing the adhesive composition to be cut, compressed or otherwise deformed at will, but preventing flowing, spilling and other random deformation of the adhesive composition. For example, in a horizontal borehole, the adhesive composition will not sag to the lower portion of the borehole or flow out. Also, the adhesive composition will not flow out of an overhead borehole.

The first part 12 suitably includes at least a resin. In one embodiment, the first part 12 includes at least an epoxy resin and a particulate filler, in proportions needed to achieve the desired viscosity. In another embodiment, the first part 12 includes about 20-49% by weight of an epoxy resin, about 50-80% by weight sand, and about 1-10% by weight fumed silica. Suitably, the first part 12 includes about 28-40% by weight of an epoxy resin, about 55-70% by weight sand, and about 2-6% by weight fumed silica.

The second part 14 includes at least a curing agent. In one embodiment, the second part 14 includes at least a curing compound, a curing accelerator, and a particulate filler, in proportions needed to achieve the desired viscosity. In another embodiment, the second part 14 includes about 5-25% by weight of an amine compound, about 0.1-15% by weight of a tertiary amine compound, about 60-90% by weight sand, and about 1-10% by weight fumed silica. Suitably, the second part 14 includes about 10-20% by weight of an amine compound, about 2-10% by weight of a tertiary amine compound, about 70-80% by weight sand, and about 1-5% by weight fumed silica.

The epoxy resin is suitably a liquid epoxy derivative. Examples include novolac epoxy resins and bisphenol epoxy resins. One suitable bisphenol epoxy resin is available from Shell Chemical Co. under the trade name EPON 828. EPON 828 is a difunctional bisphenol A/epichlorohydrin derived from liquid epoxy. Other suitable epoxy resins include ARALDITE 610, available from Ciba-Geigy, and DER 331, available from Dow Chemical Co.

The particulate filler in the first part may include a blend of a first particulate filler and a second particulate filler. At least about 70% by weight of the first particulate filler has a U.S. Sieve size between 16 and 45, inclusive. A suitable first particulate filler is AGSCO Sand #1, a silica sand sold by the Agsco Company. At least about 70% by weight of the second particulate filler has a U.S. Sieve size between 60 and 100, inclusive. A suitable second particulate filler is Sand 70-100, a silica sand sold by the Agsco Company. The sand in the first part 12 may include about 3-7 parts by weight of the first sand per one part by weight second sand, suitably about 4-5 parts by weight of the first sand per one part by weight of the second sand, based on the combined weight of particulate fillers in the first part 12. The particulate filler in the first part 12 of the adhesive slug 10 may also include fumed silica in an amount of about 0.1-0.8 parts by weight, suitably about 0.3-0.4 parts by weight fumed silica per one part by weight of second sand. A suitable fumed silica is R-202, available from the DeGussa Company.

The particulate filler in the second part 14 of adhesive slug 10 may include the foregoing second particulate filler, at least about 70% by weight of the particulate filler having a U.S. Sieve size of 60-100, inclusive. The particulate filler in the second part may also include fumed silica in an amount of about 1-10 parts by weight, suitably about 2-3 parts by weight fumed silica per 100 parts by weight second particulate filler, based on the combined weight of particulate fillers in the second part 14 of adhesive slug 10.

The curing agent may include a curing compound and a curing accelerator. In one embodiment, the curing compound is an amine compound, defined as meaning an amine or chemical derivative thereof, but not a tertiary amine. Suitable amine compounds include amines, aliphatic amines, aminoethylpiperazine, amido amines, cycloaliphatic amines and the like. Suitable aliphatic amines include Mannich bases. One suitable Mannich base is sold by Air Products Co. under the name ANCAMINE 1856. Other suitable amines include ANCAMINE 1767, ANCAMINE 1768 and ANCAMINE 2422.

The curing accelerator can be a tertiary amine compound. Examples of suitable tertiary amines include ANCAMINE 110, ANCAMINE K61B, and ANCAMINE K54, all sold by Air Products Co., and EPICURE 3253 sold by Shell Chemical Co. ANCAMINE K54 is particularly suitable, and is a tris-(dimethylaminomethyl)phenol.

The following exemplary compositions are suitable for the first part 12 and the second part 14 of the chemical anchoring adhesive slug 10.

| Material | % By Weight |
| --- | --- |
| First Part (Resin) | |
| EPON 828 (Bisphenol A Epoxy Resin) | 35.00 |
| AGSCO Sand 70-100 | 11.00 |
| R-202 (fumed silica) | 4.00 |
| AGSCO Sand #1 | 50.00 |
| Total | 100.00 |
| Second Part (Hardener) | |
| ANCAMINE 1856 (modified aliphatic amine) | 14.50 |
| ANCAMINE 2422 (amine) | 3.00 |
| ANCAMINE K54 (tertiary amine) | 5.00 |
| R-202 (fumed silica) | 3.00 |
| AGSCO Sand 70-100 | 74.50 |
| Total | 100.00 |

In the foregoing example, the adhesive composition may include 13 parts by weight (59% by weight) of the first part 12 and 9 parts by weight (41% by weight) of the second part 14. The exemplified first part 12 has a viscosity of about 880,000 centipoise. The exemplified second part 14 has a viscosity of 569,600 centipoise.

To manufacture the adhesive composition, the ingredients of the first part 12 can be mixed in a first mixer, and the ingredients of the second part 14 can be mixed in a second mixer. The separate mixers can be drum tumblers, sigma blade mixers, planetary mixers, extrusion mixers, press mixers, and the like. Vigorous mixing, requiring shear without added heat, may be employed to ensure a homogenous distribution of ingredients in each of the first part 12 and the second part 14. The first part 12 and second part 14 may then be extruded and/or pressed adjacent to each other, using separate extruders and/or presses that converge in a single die, to form the biconstituent adhesive composition shown in FIG. 1, having the interface 17 between first part 12 and second part 14.

Figure 4A:
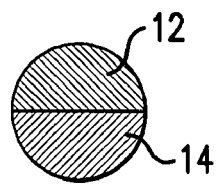
FIGS. 4a-4i illustrate, in cross-section, several extruded configurations for the two parts of the adhesive composition.
Figure 4B:
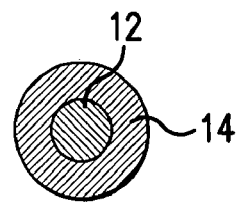
Figure 4C:
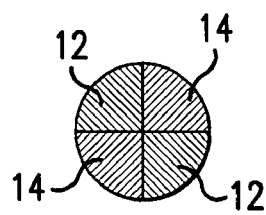
Figure 4D:
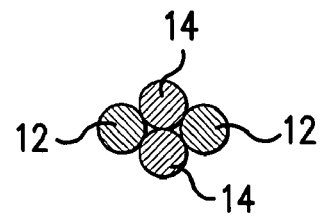
Figure 4E:
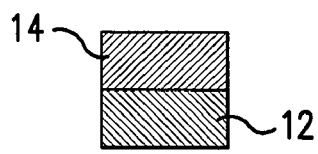
Figure 4F:
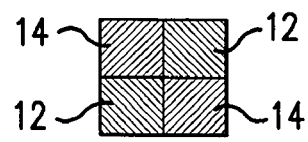
Figure 4G:
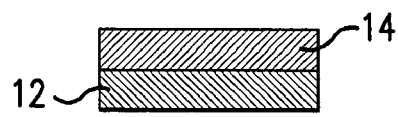
Figure 4H:
Figure 4I:
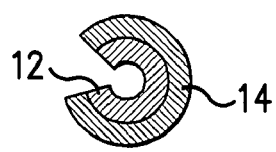

The first part 12 and second part 14 of the adhesive may be extruded and/or pressed together in a wide variety of configurations. In the preferred configuration, exemplified in FIG. 4(a), the adhesive has a cylindrical or elliptical configuration, with each part 12 and 14 occupying halves of the cylinder. Other possible configurations are a sheath-core configuration (FIG. 4(b)), a quadro-cylindrical configuration (FIG. 4(c)), a clover leaf configuration (FIG. 4(d)), various square and rectangular configurations (FIGS. 4(e), 4(f), and 4(g)), a triangular configuration (FIG. 4(h)), and a curled configuration (FIG. 4(i)).

Once the adhesive composition has been extruded, it may be covered with a wrapper 16. The adhesive composition may then be cut into individual slugs 10 as shown in FIG. 1, or may be stored as a coiled rope 20 as shown in FIG. 2. When stored as a rope 20, the adhesive composition may be cut into individual slugs 10, having any desired sizes, at the construction site or before entering the construction site.

Figure 3:
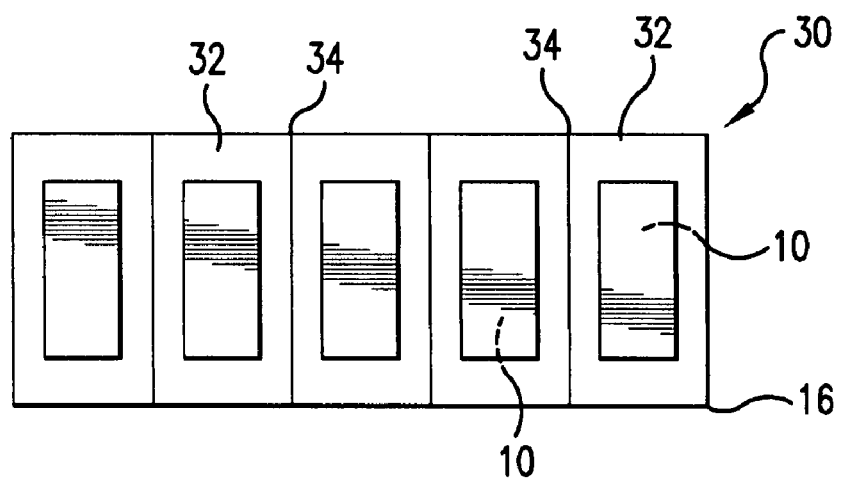
FIG. 3 illustrates a package containing several adhesive slugs of the invention.

The slugs 10 or rope 20 of chemical anchoring adhesive may be individually wrapped with film wrapper 16 as shown in FIGS. 1 and 2. Alternatively, the wrapper 16 may be formed into a package 30 as shown in FIG. 3. The package 30 may include a plurality of individual pouches 32, with adjacent pouches separated by a barrier 34 which can be a heat sealed region or a film extending between adjacent pouches. An individual slug 10 of chemical anchoring adhesive can be stored in each of the pouches 32.

Wrapper 16 can be formed of plastic, aluminum foil, paper or the like. In one suitable embodiment, the film wrapper 16 includes an outer film layer which forms a barrier to oxygen and light, and an inner film layer which forms a barrier to moisture and has heat seal properties. The outer layer is suitably formed of a metallized polymer, which is a combination of metal particles and thermoplastic polymer. The polymer is suitably a polyamide, can be nylon 6, nylon 11, nylon 12, nylon 6/6, nylon 6/10, nylon 6/12 or the like, and is suitably nylon 6. The polyamide can also be a copolymer, such as polyether amide. Other metallized polymers, such as metallized polyester or metallized polypropylene, may alternatively be used. The metal particles can be particles of aluminum, copper, zinc, cobalt, nickel, iron, silicon, titanium or the like, as well as oxides of these metals. The metal particles are suitably aluminum. The metal particles may have an average particle diameter of about 0.1-25 microns, suitably about 0.5-15 microns, particularly about 1-10 microns. The metal particles may be blended with the polyamide or deposited on a polyamide film surface using a conventional metal deposition/coating technique.

The outer film layer of wrapper 16 may include about 50-99.9% by weight polymer and about 0.1-50% by weight metal particles, suitably about 75-99.5% by weight polymer and about 0.5-25% by weight metal particles, particularly about 95-99% by weight polymer and about 1-5% by weight metal particles. The outer film layer may have a thickness of about 2-30 microns, suitably about 5-25 microns, particularly about 10-20 microns.

The inner film layer of wrapper 16 can be formed of a polyolefin. A particularly suitable polyolefin, which has both moisture barrier and heat seal properties, is linear low density polyethylene. Linear low density polyethylene is a random copolymer of ethylene with about 1-15% by weight $C_3$-$C_{20}$ alpha-olefin comonomer. A particularly suitable linear low density polyethylene is a random copolymer of ethylene with butene, hexene or octene.

The polyolefin can be made using a Ziegler-Natta catalyst, a single-site (e.g., metallocene) catalyst, or another suitable catalyst. The polyolefin may have a melt index (measured at 190° C. using a 2160-gram weight) of about 0.5-25 grams/10 min., suitably about 1-10 grams/10 min. The inner film layer of wrapper 16 may have a thickness of about 3-30 microns, suitably about 10-25 microns, particularly about 4-20 microns.

One commercially available two-layer film, suitable for use in forming the film wrapper 16, can be obtained from Glenroy, Inc. The two-layer film includes an outer layer of metallized nylon 6 (made using aluminum particles) having a thickness of 12.2 microns. The outer layer is obtained from Honeywell, Inc. under the trade name CAPRAN EMBLEM MT-200. The commercial film includes an inner layer of linear low density polyethylene having a thickness of 16.5 microns.

The chemical anchoring adhesive may be wrapped with film wrapper 16 using any suitable technique. The wrapper 16 may be the only wrapper employed. In another embodiment, the chemical anchoring adhesive may be extruded onto a carrier stretch-wrap film, such as a film made from linear low-density polyethylene, and pre-wrapped in the carrier film. The rope of pre-wrapped chemical anchoring adhesive can then be cut into individual pre-wrapped slugs 10. The pre-wrapped slugs 10 are then further wrapped using the film wrapper 16 according to the invention.

Figure 5:
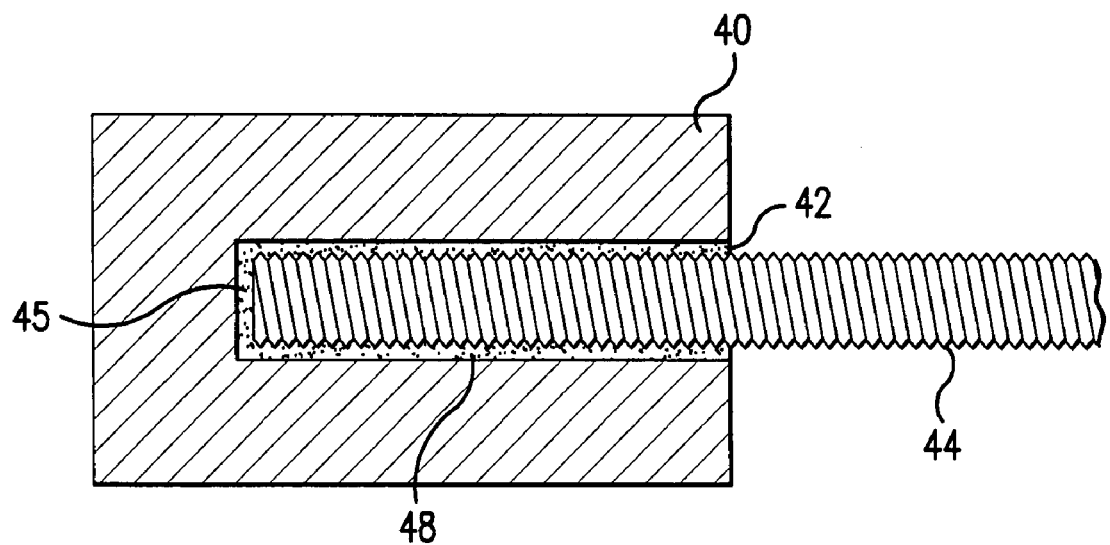
FIG. 5 illustrates a borehole, and an anchoring pin held into the borehole using the viscous adhesive composition.

Referring to FIG. 5, the slugs of chemical anchoring adhesive are applied as follows. A slug 10 is inserted into a borehole 42 formed in a workpiece 40. A driving tool (not shown) is used to drive an anchor pin 44 into the borehole 42. A typical anchor pin 44 may be threaded, and may have a flat or pointed forward end. A typical driving tool uses rapid rotational motion to spin the anchor pin 44 into the borehole 42 and may employ a combination of hammering (axial motion) with rotational motion.

The movement of the driving tool, and consequent motion of the anchor pin 44, causes disintegration of the wrapper 16 (if it surrounds the adhesive slug 10), and mixing of the first and second parts 12 and 14 of the adhesive slug 10. The threads on the anchor pin aid in the mixing. As the anchor pin is driven into the borehole, the first part 12, second part 14 and wrapper 16 (if present) are blended into a substantially homogeneous mixture 45 which fills most of the space 48 between the anchor pin and inner wall of the borehole. The mixing action substantially cures the mixture to firmly secure the anchor pin within the borehole.

While the embodiments of the invention described herein are presently preferred, various modifications and improvements can be made without departing from the spirit and scope of the invention. The scope of the invention is indicated by the appended claims, and all changes that fall within the meaning and range of equivalents are intended to be embraced therein.

We claim:

1. An anchoring adhesive, comprising:
    a first part including at least a resin, a first particulate filler, and a second particulate filler, the first part having a viscosity of about 200,000 to about 4,000,000 centipoise; and
    a second part including at least a curing agent, and having a viscosity of about 200,000 to about 4,000,000 centipoise;
    the first and second parts being directly joined along an interface;
    at least about 70% by weight of the first particulate filler having a U.S. Sieve size between 16 and 45, inclusive;
    at least about 70% by weight of the second particulate filler having a U.S. Sieve size between 60 and 100, inclusive.

2. The anchoring adhesive of claim 1, wherein the first part has a viscosity of about 500,000 to about 1,000,000 centipoise and the second part has a viscosity of about 500,000 to about 1,000,000 centipoise.

3. The anchoring adhesive of claim 1, wherein the resin comprises an epoxy resin.

4. The anchoring adhesive of claim 3, wherein the first particulate filler comprises a first silica sand and the second particulate filler comprises a second silica sand.

5. The anchoring adhesive of claim 1, wherein the curing agent comprises a curing compound and a curing accelerator.

6. The anchoring adhesive of claim 5, wherein the curing compound comprises an amine compound and the curing accelerator comprises a tertiary amine compound.

7. The anchoring adhesive of claim 6, wherein the second part further comprises fumed silica.

8. An anchoring adhesive, comprising:
about 10-90% by weight of a first part having a viscosity of about 200,000 to about 4,000,000 centipoise, the first part including about 28-40% by weight of an epoxy resin, about 50-75% by weight sand, and about 2-6% by weight fumed silica; and
about 10-90% by weight of a second part including at least a curing agent and having a viscosity of about 200,000 to about 4,000,000 centipoise;
the first and second parts being directly joined along an interface.

9. The anchoring adhesive of claim 8, comprising about 25-80% by weight of the first part and about 20-75% by weight of the second part.

10. The anchoring adhesive of claim 8, comprising about 50-75% by weight of the first part and about 25-50% by weight of the second part.

11. The anchoring adhesive of claim 8, wherein the second part comprises:
about 5-25% by weight of an amine compound;
about 0.1-15% by weight of a tertiary amine compound;
about 60-90% by weight sand; and
about 0.1-10% by weight fumed silica.

12. The anchoring adhesive of claim 11, wherein the second part comprises:
about 10-20% by weight of the amine compound;
about 2-10% by weight of the tertiary amine compound;
about 70-80% by weight of the sand; and
about 1-5% by weight of the fumed silica.

13. An anchoring adhesive, comprising:
a first part including about 20-49% by weight of an epoxy resin, about 50-80% by weight sand, and about 1-10% by weight fumed silica; and
a second part including about 5-25% by weight of an amine compound, about 0.1-15% by weight of a tertiary amine compound, about 60-90% by weight sand, and about 1-10% by weight fumed silica, wherein at least about 70% by weight of the sand in the second part has a U.S. Sieve size between 60 and 100, inclusive;
the first and second parts being directly joined along an interface.

14. The anchoring adhesive of claim 13, wherein the sand in the first part comprises:
a first sand, at least about 70% by weight of the first sand having a U.S. Sieve size between 16 and 45, inclusive; and
a second sand, at least about 70% by weight of the second sand having a U.S. Sieve size between 60 and 90, inclusive;
the sand in the first part including about 3-7 parts by weight of the first sand per one part by weight of the second sand.

15. The anchoring adhesive of claim 13, wherein the amine compound comprises an aliphatic amine.

16. The anchoring adhesive of claim 13, wherein the tertiary amine compound comprises tris-(dimethylaminoethyl)phenol.

* * * * *